(12) United States Patent
McDaniel

(10) Patent No.: US 9,670,395 B2
(45) Date of Patent: Jun. 6, 2017

(54) TREATMENT OF A SUBTERRANEAN FORMATION WITH COMPOSITION INCLUDING A MICROORGANISM OR COMPOUND GENERATED BY THE SAME

(71) Applicant: Halliburton Energy Services, Inc., Houston, TX (US)

(72) Inventor: Cato Russell McDaniel, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 737 days.

(21) Appl. No.: 13/867,536

(22) Filed: Apr. 22, 2013

(65) Prior Publication Data

US 2014/0315765 A1 Oct. 23, 2014

(51) Int. Cl.
| | |
|---|---|
| C09K 8/60 | (2006.01) |
| C09K 8/20 | (2006.01) |
| C09K 8/582 | (2006.01) |
| C09K 8/035 | (2006.01) |
| C09K 8/467 | (2006.01) |
| C09K 8/52 | (2006.01) |
| C09K 8/64 | (2006.01) |
| C09K 8/68 | (2006.01) |
| C09K 8/72 | (2006.01) |
| C04B 28/02 | (2006.01) |
| C04B 103/00 | (2006.01) |
| C04B 103/44 | (2006.01) |
| C04B 111/20 | (2006.01) |

(52) U.S. Cl.
CPC ............. *C09K 8/582* (2013.01); *C04B 28/02* (2013.01); *C09K 8/035* (2013.01); *C09K 8/467* (2013.01); *C09K 8/52* (2013.01); *C09K 8/64* (2013.01); *C09K 8/68* (2013.01); *C09K 8/725* (2013.01); *C04B 2103/0067* (2013.01); *C04B 2103/44* (2013.01); *C04B 2111/20* (2013.01)

(58) Field of Classification Search
CPC ........ C09K 8/582; C09K 8/035; C09K 8/467; C09K 8/52; C09K 8/64; C09K 8/68; C09K 8/725
USPC .................................. 507/101, 201
See application file for complete search history.

(56) References Cited

U.S. PATENT DOCUMENTS

| | | | | |
|---|---|---|---|---|
| 4,481,294 A * | 11/1984 | Downs | ..................... | C12N 1/06 166/246 |
| 4,941,533 A | 7/1990 | Buller et al. | | |
| 6,436,680 B1 | 8/2002 | Guezennec et al. | | |
| 6,545,145 B1 * | 4/2003 | Rougeaux | ............... | A23L 1/054 426/658 |
| 6,855,524 B1 * | 2/2005 | Nore | ........................ | C12P 19/06 424/115 |
| 2009/0023613 A1 | 1/2009 | Li et al. | | |
| 2010/0093046 A1 * | 4/2010 | Remmereit | ............... | C02F 3/34 435/134 |
| 2010/0093095 A1 | 4/2010 | Yamazaki | | |
| 2013/0288932 A1 * | 10/2013 | Mackenzie | ........... | C08B 37/003 507/112 |

FOREIGN PATENT DOCUMENTS

WO WO-2014/176061 A1 10/2014

OTHER PUBLICATIONS

"Colombian Application Serial No. 15.209.751, Office Action mailed Sep. 22, 2015", 4 pgs.
"International Application Serial No. PCT/US2014/033991, International Preliminary Report on Patentability mailed Nov. 5, 2015", 29 pgs.
"International Application Serial No. PCT/US2014/033991, International Search Report mailed Aug. 25, 2014", 4 pgs.
"International Application Serial No. PCT/US2014/033991, Written Opinion mailed Aug. 25, 2014", 27 ps.
Nicolous, B., et al., "Polysaccharides from extremophilic microorganisms", *Origins of Life and Evolution of the Biosphere*, 34(1-2), (2004), 159-169.
Arias, S., et al., "Mauran, an exopolysaccharide produced by the halophilic bacterium *Halomonas maura*, with a novel composition and interesting properties for biotechnology", Extremophiles, 7, (2003), 319-326.
Bouchotroch, S., et al., "*Halomonas maura* sp. nov.,a novel moderately halophilic, exopolysaccharide-producing bacterium", International Journal of Systematic and Evolutionary Microbiology, 51, (2001), 1625-1632.
Poli, A., et al., "Synthesis, Production, and Biotechnological Applications of Exopolysaccharides and Polyhydroxyalkanoates by Archaea", Archaea, vol. 2011, Article ID693253, (2011), 13 pgs.
"Australian Application Serial No. 2014257381, First Examiner Report mailed Mar. 1, 2016", 5 pgs.

(Continued)

*Primary Examiner* — Aiqun Li
(74) *Attorney, Agent, or Firm* — Tenley Krueger Tumey L.L.P.

(57) ABSTRACT

The present invention relates to methods of treating a subterranean formation with a composition including a compound made by a microorganism or a microorganism that can make the compound. Various embodiments provide methods of using compositions for treatment of subterranean formations including exopolysaccharides or microorganisms that can make exopolysaccharides under downhole conditions. In various embodiments, the present invention provides a method of treating a subterranean formation, including providing at least one exopolysaccharide by subjecting an extremophilic or extremotolerant microorganism to conditions such that the microorganism forms the exopolysaccharide, or by subjecting a microorganism genetically modified using an extremophilic or extremotolerant microorganism to conditions such that the microorganism forms the exopolysaccharide. The method can also include contacting a composition including the exopolysaccharide with a subterranean material downhole.

17 Claims, No Drawings

(56) References Cited

OTHER PUBLICATIONS

Danish Search Report for Danish Patent Application No. PA 2015 00537 dated Nov. 10, 2016.
Cojoc, R., et al., "Highly Thermostable Exopolysaccharide Produced by the Moderately Halophilic Bacterium Isolated from a Man-Made Young Salt Lake in Romania", *Polish Journal of Microbiology*, 58(4), (2009), 289-294.
Crapart, S., et al., "*Exiguobacterium profundum* sp. nov.,a moderately thermophilic, lactic acid-producing bacterium isolated from a deep-sea hydrothermal vent", *International Journal of Systematic and Evolutionary Microbiology*, 57, (2007), 287-292.
Guezennec, J., "Deep-sea hydrothermal vents: A new source of innovative bacterial exopolysaccharides of biotechnological interest?", *Journal of Industrial Microbiology & Biotechnology*, 29, (2002), 204-208.
Leivers, S., et al., "Characterisation of Bacterial Exopolysaccharides", Doctoral Thesis, University of Huddersfield, (2011), 196 pgs.
Nicols, C. A. M., et al., "Bacterial Exopolysaccharides from Extreme Marine Environments with Speical Consideration of the Southern Ocean, Sea Ice, and Deep-Sea Hydrothermal Vents: A Review", *Marine Biotechnology*, 7, (2005), 253-271.
Poli, A., et al., "Bacterial Exopolysaccharides from Extreme Marine Habitats: Production, Characterization and Biological Activities", *Marine Drugs*, 8(6), (2010), 1779-1802.
Radchenkova, N., et al., "Biosynthesis of an Exopolysaccharide Produced by *Brevibacillus Thermoruber* 438", *Biotechnol. & Biotechnol. Eq.*, 25(4), Suppl., (2011), 77-79.

\* cited by examiner

US 9,670,395 B2

TREATMENT OF A SUBTERRANEAN FORMATION WITH COMPOSITION INCLUDING A MICROORGANISM OR COMPOUND GENERATED BY THE SAME

BACKGROUND OF THE INVENTION

During the drilling, extraction, and production of petroleum materials, extreme conditions can be experienced downhole that make these activities difficult. For example, some wells can have high salinity, extreme pH, high temperature, high pressure conditions. Wells with undisturbed bottomhole temperatures above about 150-177° C. can be classified as high temperature, with temperatures above about 204-218° C. ultra-high temperature, and with temperatures above about 260° C. generally considered extreme-high temperature. Wells with wellhead pressure greater than about 10,000-15,000 psi are considered high pressure, with pressures above about 15,000-20,000 psi ultra-high pressure, and with pressures above about 30,000 psi generally considered extreme high pressure.

During the drilling, completion, and production phases of wells for petroleum or water extraction, the downhole use of compositions having high viscosities is important for a wide variety of purposes. Higher viscosity fluids can more effectively carry materials to a desired location downhole, such as proppants. Similarly, higher viscosity drilling fluids can more effectively carry materials away from a drilling location downhole.

Various materials used to affect properties of fluids downhole can degrade and become ineffective under the extreme conditions experienced downhole in some wells. For example, guar gum can be used to increase viscosity but can degrade under various extreme downhole conditions.

SUMMARY OF THE INVENTION

In various embodiments, the present invention provides a method of treating a subterranean formation. The method includes providing at least one exopolysaccharide by at least one of subjecting an extremophilic or extremotolerant microorganism to conditions such that the microorganism forms the exopolysaccharide, and subjecting a microorganism genetically modified using an extremophilic or extremotolerant microorganism to conditions such that the microorganism forms the exopolysaccharide. The method also includes contacting a composition including the exopolysaccharide with a subterranean material downhole. In some examples, the at least one exopolysaccharide can exhibit improved properties under extreme conditions, such as improved thermostability or salt tolerance, as compared to other compounds, as compared to exopolysaccharides generated by non-extremophilic or non-extremotolerant organisms, or as compared to exopolysaccharides made by microorganisms not genetically modified using genes from extremophile or extremotolerant microorganisms.

In various embodiments, the present invention provides a method of treating a subterranean formation. The method includes providing at least one exopolysaccharide by at least one of subjecting an extremophilic or extremotolerant microorganism to conditions such that the microorganism forms the exopolysaccharide, and subjecting a microorganism genetically modified an extremophilic or extremotolerant microorganism to conditions such that the microorganism forms the exopolysaccharide (e.g., genetically modified using genes from an extremophilic or extremotolerant microorganism). The extremophilic or extremotolerant microorganism includes at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas*, and *Zymomonas*. The method also includes contacting a composition comprising the exopolysaccharide with a subterranean material downhole.

In various embodiments, the present invention provides a method of treating a subterranean formation. The method includes providing at least one exopolysaccharide by at least one of subjecting an extremophilic or extremotolerant microorganism to conditions such that the microorganism forms the exopolysaccharide, and subjecting a microorganism genetically modified using an extremophilic or extremotolerant microorganism to conditions such that the microorganism forms the exopolysaccharide. The exopolysaccharide can include be any suitable exopolysaccharide, for example at least one of acetan, alginate, cellulose, chitosan, curdlan, a cyclosophoran, dextran, emulsan, a galactoglucopolysaccharide, gellan, glucuronan, N-acetylglucosamine, N-acetyl-heparosan, hyaluronic acid, indicant, kefiran, lentinan, levan, mauran, pullulan, scleroglucan, schizophyllan, stewartan, succinoglycan, xanthan, and welan. The method also includes contacting a composition comprising the exopolysaccharide with a subterranean material downhole.

In various embodiments, the present invention provides a method of treating a subterranean formation. The method includes obtaining or providing a composition including a microorganism. The composition has a viscosity. The method also includes contacting the composition with a subterranean material downhole. The contacting occurs under conditions such that the microorganism produces at least one compound. The at least one compound increases the viscosity of the composition.

In various embodiments, the present invention provides a method of treating a subterranean formation. The method includes obtaining or providing a composition including a microorganism. The method also includes contacting the composition with a subterranean material downhole. The contacting occurs such that the microorganism produces an exopolysaccharide.

In various embodiments, the present invention provides a method of treating a subterranean formation. The method includes obtaining or providing a composition including a microorganism. The microorganism includes at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Meth-*

*ylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas.* The method also includes contacting the composition with a subterranean material downhole.

In various embodiments, the present invention provides a method of treating a subterranean formation. The method includes obtaining or providing a composition including an exopolysaccharide. The method also includes contacting the composition with a subterranean material downhole.

In various embodiments, the present invention provides a composition for treatment of a subterranean formation. The composition includes an exopolysaccharide.

In various embodiments, the present invention provides a composition for treatment of a subterranean formation. The composition includes a microorganism that generates an exopolysaccharide under downhole conditions. The composition also includes a downhole fluid.

In various embodiments, the present invention provides a composition for treatment of a subterranean formation. The composition includes a microorganism. The microorganism includes at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas.*

In various embodiments, the present invention provides a method for preparing a composition for treatment of a subterranean formation. The method includes obtaining or providing a composition including an exopolysaccharide. The exopolysaccharide is provided by at least one of subjecting an extremophilic or extremotolerant microorganism to conditions such that the microorganism forms the at least one exopolysaccharide, and subjecting a microorganism genetically modified using an extremophilic or extremotolerant microorganism to conditions such that the microorganism forms the at least one exopolysaccharide. The method also includes combining the composition with a downhole fluid. In some examples, the exopolysaccharide can be In various embodiments, the present invention provides a method for preparing a composition for treatment of a subterranean formation. The method includes obtaining or providing a composition including a microorganism. The microorganism generates an exopolysaccharide under downhole conditions. The method also includes combining the composition with a downhole fluid.

In various embodiments, the present invention provides a method for preparing a composition for treatment of a subterranean formation. The method includes obtaining or providing a composition including an exopolysaccharide. The method also includes combining the composition with a downhole fluid.

Various embodiments of the present invention provide certain advantages over other methods of treating subterranean formations and compositions for treating subterranean formations, at least some of which are unexpected. For example, compounds normally used to increase viscosity downhole, such as guar, xanthan, and scleroglucan, can degrade or become ineffective under extreme conditions experienced downhole, such as high temperature, high pressure, high salinity, or extreme pH conditions. However, the methods and compositions of the present inventions can include exopolysaccharides that degrade less or remain more effective under a variety of extreme conditions experienced downhole as compared to other methods and compositions. In some embodiments, the exopolysaccharides made by the microorganism can modify various properties of a composition contacting a subterranean material downhole such as viscosity more easily, with less cost, or more effectively than other compositions and methods for modifying properties of downhole compositions under extreme downhole conditions or other conditions.

Organisms like *Xanthomonas campestris* which produce xanthan gum can grow at near room temperature. Xanthan gum is not completely thermally stably in water at 100-140° C., since it slowly degrades and loses the ability to provide viscosity to a drilling fluid. However, microorganisms that thrive in or are tolerant of 100° C. growing conditions can produce exopolysaccharides which are more stable at 100° C. Microorganisms such as extremophilic or extremotolerant microorganisms can produce exopolysaccharides that are more tolerant to the extreme conditions the microorganisms thrive in or are tolerant of. Embodiments of the present invention can advantageously utilize the extremophilic or extremotolerant exopolysaccharides produced by extremophilic or extremotolerant microorganisms to treat subterranean formations and to form compositions for treatment of subterranean formations.

In some embodiments, viscosity-modifying compounds made by the microorganism can be compounds, such as certain exopolysaccharides, that have never before been used in downhole compositions, or that have never been used downhole in extreme conditions; various embodiments include use of such compounds in downhole compositions wherein the composition does not include the microorganism, while other embodiments include downhole compositions including the microorganism. In other embodiments, the particular viscosity-modifying compound has been previously used in downhole compositions, but has never been made downhole by a microorganism in a method of treating a subterranean formation, or has never been made above the surface using conditions such as extreme conditions or using a microorganism genetically modified using an extremophilic or extremotolerant microorganism.

In various examples, unexpectedly, contacting a composition including a microorganism downhole can provide convenient and effective control of the properties of materials downhole, allowing easier or more cost effective drilling and extraction during, for example, extreme downhole conditions, such as at least one of high temperature, high pressure, high salinity, and extreme pH conditions. For example, the compounds made by the microorganism in various embodiments can modify various properties of a composition contacting a subterranean material downhole such as viscosity more easily, with less cost, or more effectively than other compositions and methods for modifying properties of downhole compositions in extreme downhole conditions. In some embodiments, by varying the microorganism, the type of compound used, the concentration of the microorganism or compound, and the presence and concentration of various additives in the composition, the properties of the composition downhole, such as the viscosity, can be more precisely controlled than in other methods and compositions. In various embodiments, use of a microorganism in downhole composition to synthesize a compound to modify properties of the composition downhole such as viscosity can advantageously supplement, maintain, or increase the concentration of the compound as the compound is diluted downhole, or as the compound is degraded by extreme conditions downhole.

In some embodiments, generating or supplementing a compound downhole using a microorganism that produces the compound to change the properties of a downhole composition while the composition is downhole has unique advantages that are lacking from other compositions and methods. Most high viscosity liquids must be pumped or otherwise transported to a desired location, which is energy intensive and inconvenient. However, in an embodiment of the present invention, the viscosity or gelation can be conveniently increased downhole, at least partially avoiding the difficulty and expense of pumping or otherwise transporting a highly viscous fluid to a downhole location.

In some embodiments, downhole conditions, such as extreme downhole conditions, can advantageously trigger the microorganism to produce or increase the production of a compound that can change the properties of the downhole composition, such as viscosity. In various embodiments, an ability of the composition to increase in viscosity as a result of extreme conditions such as high heat, high pressure, or high salinity can allow the properties of the composition to be adjusted, such as viscosity of the composition to be raised, conveniently using events controllable from the surface when the composition is in or near to the downhole location where a higher viscosity material is desired. In some examples, the composition can be selectively heated, pressurized, or exposed to higher salinity at a downhole location, conveniently increasing the viscosity of the composition at a desired location at a desired time.

DETAILED DESCRIPTION OF THE INVENTION

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean material can be any section of a wellbore and any section of an underground formation in fluid contact with the wellbore, including any materials placed into the wellbore such as cement, drill shafts, liners, tubing, or screens. In some examples, a subterranean material can be any below-ground area that can produce liquid or gaseous petroleum materials, water, or any section below-ground in fluid contact therewith.

Method of Treating a Subterranean Formation Using a Composition Including an Exopolysaccharide.

In various embodiments, the present invention provides a method of treating a subterranean formation. The method includes obtaining or providing a composition including an exopolysaccharide. The exopolysaccharide is provided by at least one of subjecting an extremophilic or extremotolerant microorganism to conditions such that the microorganism forms the at least one exopolysaccharide, and subjecting a microorganism genetically modified using an extremophilic or extremotolerant microorganism to conditions such that the microorganism forms the at least one exopolysaccharide. The method also includes contacting the composition with a subterranean material downhole.

The composition that contacts the subterranean material can be formed in any suitable location and at any suitable time with respect to the production of the compound that modifies a property of the composition, such as the viscosity. In various examples, the composition can be formed above the surface, in the borehole above a location wherein the properties of the composition are desired to be modified, or at or near the downhole location wherein the composition including the exopolysaccharide is contacted with the subterranean material. In some embodiments, the obtaining or providing of the composition is performed downhole; e.g., an exopolysaccharide can be placed downhole (e.g., pumped, injected) to join a downhole fluid mixture that is present downhole to form the composition that contacts the subterranean material. In another embodiment, the obtaining or providing of the composition can be performed above the surface, e.g. a suitable downhole fluid can be combined with the exopolysaccharide above the surface to form the composition that can contact the subterranean material downhole and experience a change in properties, such as an increase in viscosity.

The at least one exopolysaccharide can be provided in any suitable location and at any suitable time with respect to the contacting of the composition including the exopolysaccharide and the subterranean material. For example, the at least one exopolysaccharide can be formed by the microorganism that is subjected to suitable conditions above the surface, or downhole, or a combination thereof.

The conditions the microorganism is subjected to such that it forms the exopolysaccharide can be any suitable conditions. In some embodiments, the conditions can be non-extreme conditions, such as for a microorganism that has been modified using genetic material of an extremophilic or extremotolerant microorganism to make an exopolysaccharide. In other embodiments, the conditions can be extreme conditions, such as for a microorganism that is extremophilic or extremotolerant. In various embodiments, extreme conditions can include conditions typically considered at least one of high, ultra, or extreme (e.g., any conditions beyond normal can be considered extreme); in other embodiments extreme conditions include only conditions typically considered extreme conditions. In some embodiments, the conditions the microorganism is subjected to such that it forms the exopolysaccharide include at least one of high temperature conditions, high salinity conditions, high pressure conditions, and high pH conditions, and low pH conditions.

The microorganism can be subject to the conditions sufficient for production of the exopolysaccharide in any suitable manner. In some embodiments, the microorganism can be placed in a suitable container with suitable growth medium or other suitable medium such that the microorganism can synthesize the exopolysaccharide. Once a suitable concentration of exopolysaccharide has been produced, in some embodiments the exopolysaccharide can be separated from the microorganism and other materials before being placed downhole. In some embodiments, the method can include culturing the microorganism such that it multiplies, prior to or during the subjecting of the microorganism to conditions suitable for exopolysaccharide formation.

During the subjecting the microorganism to conditions such that it forms the exopolysaccharide, the temperature can be any suitable temperature. In some embodiments, during the subjecting the microorganism to conditions such that it forms the exopolysaccharide, the conditions can include a temperature of about 50 to about 600° C., or about 150 to about 500° C., or less than about 50° C., or about 60° C., 70, 80, 90, 100, 110, 120, 130, 140, 150, 160, 170, 180, 190, 200, 210, 220, 230, 240, 250, 260, 270, 280, 290, 300, 310, 320, 330, 340, 350, 375, 400, 450, 500, or about 600° C. or higher.

During the subjecting the microorganism to conditions such that it forms the exopolysaccharide, the salinity can be any suitable salinity. In some embodiments, during the subjecting the microorganism to conditions such that it forms the exopolysaccharide, the conditions can include a salt concentration of about 0.000,000,1 g/L to about 250 g/L, or about 10 g/L to about 250 g/L, or about 0.000,000,1 g/L or less, or about 0.000,001 g/L, 0.000,01, 0.000,1, 0.001, 0.01, 0.1, 1, 5, 10, 15, 20, 25, 30, 35, 40, 45, 50, 55, 60, 65, 70, 75, 80, 90, 100, 125, 150, 175, 200, 225, 250, 275 g/L, or about 300 g/L or more. The salt can include at least one of NaCl, NaBr, $CaCl_2$, $CaBr_2$, or $ZnBr_2$. During the subjecting the microorganism to conditions such that it forms the exopolysaccharide, the concentration of $Na^+$ ions can be any suitable concentration of $Na^+$ ions, such as about 5 ppmw to about 200,000 ppmw, or about 100 ppmw to about 7,000 ppmw, or about 5 ppmw or less, or about 10 ppmw, 50, 100, 500, 1000, 5,000, 10,000, 15,000, 20,000, 50,000, 75,000, 100,000, 150,000, or about 200,000 ppmw or higher. During the subjecting the microorganism to conditions such that it forms the exopolysaccharide, the concentration of $Cl^-$ ions can be any suitable concentration of $Cl^-$ ions, such as about 10 ppmw to about 400,000 ppmw, about 200 ppmw to about 14,000 ppmw, or about 10 ppmw or less, or about 20, 50, 100, 200, 500, 1,000, 2,500, 5,000, 7,500, 10,000, 12,500, or about 14,000 ppmw or more. During the subjecting the microorganism to conditions such that it forms the exopolysaccharide, the concentration of $K^+$ ions can be any suitable concentration of $K^+$ ions, such as about 1 ppmw to about 70,000 ppmw, about 40 ppmw to about 2,500 ppmw, or about 1 ppmw or less, or about 10 ppmw, 20, 50, 100, 200, 500, 1,000, 2,500, 5,000, 10,000, 15,000, 20,000, 25,000, 50,000, or about 70,000 ppmw or more. During the subjecting the microorganism to conditions such that it forms the exopolysaccharide, the concentration of $Ca^{2+}$ ions can be any suitable concentration of $Ca^{2+}$ ions, such as about 1 to about 70,000, or about 40 to about 2,500, or about 1 ppmw or less, or about 10 ppmw, 20, 50, 100, 200, 500, 1,000, 2,500, 5,000, 10,000, 15,000, 20,000, 25,000, 50,000, or about 70,000 ppmw or more. During the subjecting the microorganism to conditions such that it forms the exopolysaccharide, the concentration of $Br^-$ ions can be any suitable concentration of $Br^-$ ions, such as about 0.1 ppmw to about 12,000 ppmw, about 5 ppmw to about 450 ppmw.

During the subjecting the microorganism to conditions such that it forms the exopolysaccharide, the pressure can be any suitable pressure. In some embodiments, during the subjecting the microorganism to conditions such that it forms the exopolysaccharide, the conditions can include a pressure of about 5,000 psi to about 200,000 psi, about 10,000 psi to about 100,000 psi, or about 5,000 psi or less, or about 7,500, 10,000, 12,500, 15,000, 17,500, 20,000, 22,500, 25,000, 27,500, 30,000, 32,500, 35,000, 37,500, 40,000, 42,500, 45,000, 47,500, 50,000, 60,000, 75,000, 100,000, 125,000, 150,000, 175,000, or about 200,000 psi or more.

During the subjecting the microorganism to conditions such that it forms the exopolysaccharide, the pH can be any suitable pH. In some embodiments, during the subjecting the microorganism to conditions such that it forms the exopolysaccharide, the conditions can include a pH of about −20 to about 20, about −1 to about 14, or about −20 or less, or about −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, or about 20 or more.

The viscosity of the composition including the exopolysaccharide can be any suitable viscosity, such as about 0.01 cP to 1,000,000,000 cP or more (e.g., the composition can be a gel having essentially infinite viscosity), 1 cP to about 100,000,000, or about 10 cP to about 1,000,000, or about 0.01 cP or less, or about 0.1 cP, 1 cP, 5 cP, 10 cP, 15 cP, 20 cP, 50 cP, 100 cP, 200 cP, 500 cP, 1000 cP, 5000 cP, 10,000 cP, 50,000 cP, 100,000 cP, 500,000 cP, 1,000,000 cP, 10,000, 000 cP, 100,000,000 cP, 500,000,000 cP, or about 1,000, 000,000 cP or more. The composition can be a gel, such as a thixotropic gel.

In various embodiments, the composition that includes an exopolysaccharide can include any one or more additional ingredients. For example, the composition can include water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, density control agent, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof. Any one or more components listed in this paragraph can optionally be present or absent from the composition including the exopolysaccharide.

In some embodiments, the exopolysaccharide can modify at least one of the density, surface tension of the composition (e.g. intrafacial surface tension of an emulsion including the composition), size of the droplets or particles including the composition in an emulsion, stability of an emulsion including the composition, vapor pressure, propensity toward foaming or toward retention of foam, and ease of reversibility of increase in viscosity.

Method of Treating a Subterranean Formation Using a Composition Including a Microorganism.

In various embodiments, the present invention provides a method of treating a subterranean formation. The method can include obtaining or providing a composition including a microorganism, the composition having a viscosity. The method can include contacting the composition with a subterranean material downhole. The contacting can occur under conditions such that the microorganism produces at least one compound, such as an exopolysaccharide, that changes a property of the composition, such as that increases the viscosity of the composition. In some embodiments, the method includes obtaining or providing a composition including a microorganism, and contacting the composition with a subterranean material downhole, such that the microorganism produces and exopolysaccharide.

The composition that contacts the subterranean material can be formed in any suitable location and at any suitable time with respect to the production of the compound that modifies a property of the composition, such as the viscosity. In various examples, the composition can be formed above the surface, in the borehole above a location wherein the properties of the composition are desired to be modified, or at or near the downhole location wherein the composition including a microorganism is contacted with the subterranean material. In some embodiments, the obtaining or providing of the composition is performed downhole; e.g., a microorganism can be placed downhole (e.g., pumped, injected) to join a downhole fluid mixture that is present downhole to form the composition that contacts the subterranean material and that experiences a change in properties, such as an increase in viscosity. In another embodiment, the obtaining or providing of the composition can be performed above the surface, e.g. a suitable downhole fluid can be combined with the microorganism above the surface to form the composition that can contact the subterranean material downhole and experience a change in properties, such as an increase in viscosity.

In various embodiments, the composition that includes a microorganism can include any one or more additional ingredients. For example, the composition can include water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, density control agent, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof. Any one or more components listed in this paragraph can optionally be present or absent from the composition including a microorganism.

By at least one of adjusting various conditions such as temperature, pressure, salinity, or pH, or by adding or removing additional ingredients or adjusting the concentration thereof, modifying the concentration of the microorganism, the beginning and ending viscosity or other properties of the composition can be precisely controlled. In addition, variation of other parameters, such as those described in this paragraph, can cause variation in other properties of the composition aside from viscosity. In some embodiments, the properties that can be varied and in some embodiments controlled precisely can include density, surface tension of the composition (e.g. intrafacial surface tension of an emulsion including the composition), size of the droplets or particles including the composition in an emulsion, stability of an emulsion including the composition, vapor pressure, propensity toward foaming or toward retention of foam, and ease of reversibility of increase in viscosity. By virtue of the temperature, pressure, salinity, or pH sensitive nature of properties of the composition such as viscosity, the variation of the properties can be advantageously caused to occur prior to the desired use of the composition, or at the location where the particular properties are desired. The variation of the properties can be advantageously caused to occur in a portion of the composition near or at the site where the particular properties are desired, while allowing the properties of the remainder of the composition to remain the same.

Conditions During Contacting of Composition and Subterranean Material.

The conditions during the contacting of the composition with the subterranean material downhole can be any suitable conditions. In some embodiments, the conditions can be non-extreme conditions. In various embodiments, extreme conditions can include conditions typically considered at least one of high, ultra, or extreme; in other embodiments extreme conditions include only extreme conditions. In some embodiments, during the contacting of the composition with the subterranean material downhole, the conditions include at least one of high temperature conditions, high salinity conditions, high pressure conditions, and high pH conditions, and lower pH conditions.

During the contacting of the composition with the subterranean material, the downhole temperature can be any suitable temperature. In some embodiments, during the contacting of the composition with the subterranean material downhole, the conditions can include a temperature of about 50 to about 600° C., or about 150 to about 500° C., or less than about 50° C., or about 60° C., 70, 80, 90, 100, 110, 120, 130, 140, 150, 160, 170, 180, 190, 200, 210, 220, 230, 240, 250, 260, 270, 280, 290, 300, 310, 320, 330, 340, 350, 375, 400, 450, 500, or about 600° C. or higher.

During the contacting of the composition with the subterranean material, the downhole salinity can be any suitable salinity. In some embodiments, during the contacting of the composition with the subterranean material downhole, the conditions can include a salt concentration of about 0.000, 000,1 g/L to about 250 g/L, or about 10 g/L to about 250 g/L, or about 0.000,000,1 g/L or less, or about 0.000,001 g/L, 0.000,01, 0.000,1, 0.001, 0.01, 0.1, 1, 5, 10, 15, 20, 25, 30, 35, 40, 45, 50, 55, 60, 65, 70, 75, 80, 90, 100, 125, 150, 175, 200, 225, 250, 275 g/L, or about 300 g/L or more. The salt can include at least one of NaCl, NaBr, $CaCl_2$, $CaBr_2$, or $ZnBr_2$. During the contacting of the composition with the subterranean material, the downhole concentration of $Na^+$ ions can be any suitable concentration of $Na^+$ ions, such as about 5 ppmw to about 200,000 ppmw, or about 100 ppmw to about 7,000 ppmw, or about 5 ppmw or less, or about 10 ppmw, 50, 100, 500, 1000, 5,000, 10,000, 15,000, 20,000, 50,000, 75,000, 100,000, 150,000, or about 200,000 ppmw or higher. During the contacting of the composition with the subterranean material, the downhole concentration of $Cl^-$ ions can be any suitable concentration of $Cl^-$ ions, such as about 10 ppmw to about 400,000 ppmw, about 200 ppmw to about 14,000 ppmw, or about 10 ppmw or less, or about 20, 50, 100, 200, 500, 1,000, 2,500, 5,000, 7,500, 10,000, 12,500, or about 14,000 ppmw or more. During the contacting of the composition with the subterranean material, the downhole concentration of $K^+$ ions can be any suitable concentration of $K^+$ ions, such as about 1 ppmw to about 70,000 ppmw, about 40 ppmw to about 2,500 ppmw, or about 1 ppmw or less, or about 10 ppmw, 20, 50, 100, 200, 500, 1,000, 2,500, 5,000, 10,000, 15,000, 20,000, 25,000, 50,000, or about 70,000 ppmw or more. During the contacting of the composition with the subterranean material, the downhole concentration of $Ca^{2+}$ ions can be any suitable concentration of $Ca^{2+}$ ions, such as about 1 to about 70,000, or about 40 to about 2,500, or about 1 ppmw or less, or about 10 ppmw, 20, 50, 100, 200, 500, 1,000, 2,500, 5,000, 10,000, 15,000, 20,000, 25,000, 50,000, or about 70,000 ppmw or more. During the contacting of the composition with the subterranean material, the downhole concentration of $Br^-$ ions can be any suitable concentration of $Br^-$ ions, such as about 0.1 ppmw to about 12,000 ppmw, about 5 ppmw to about 450 ppmw.

During the contacting of the composition with the subterranean material, the downhole pressure can be any suitable pressure. In some embodiments, during the contacting of the composition with the subterranean material downhole, the conditions can include a pressure of about 5,000 psi to about 200,000 psi, about 10,000 psi to about 100,000 psi, or about 5,000 psi or less, or about 7,500, 10,000, 12,500, 15,000, 17,500, 20,000, 22,500, 25,000, 27,500, 30,000, 32,500, 35,000, 37,500, 40,000, 42,500, 45,000, 47,500, 50,000, 60,000, 75,000, 100,000, 125,000, 150,000, 175,000, or about 200,000 psi or more.

During the contacting of the composition with the subterranean material, the downhole pH can be any suitable pH. In some embodiments, during the contacting of the composition with the subterranean material downhole, the conditions can include a pH of about −20 to about 20, about −1 to about 14, or about −20 or less, or about −19, −18, −17, −16, −15, −14, −13, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 18, 19, or about 20 or more.

The viscosity of the composition prior to the contacting of the composition with the subterranean formation can be any suitable viscosity. In some embodiments, the composition prior to contacting with the subterranean material (e.g. before placing downhole, or before the composition reaches the subterranean material downhole) can be free-flowing, while in other embodiments the composition can be a thick liquid. In various examples, the viscosity of the composition prior to contacting with the subterranean material can be about 0.01 cP-500,000 cP, 0.1 cP-100,000 cP, or about 0.2 cP-10,000 cP, measured at standard temperature and pressure. In various examples, the viscosity of the composition prior to contacting with the subterranean material can be about 0.01 cP, 0.1 cP, 1 cP, 5 cP, 10 cP, 15 cP, 20 cP, 50 cP, 100 cP, 200 cP, 500 cP, 1000 cP, 5000 cP, 10,000 cP, 50,000 cP, 100,000 cP, or about 500,000 cP, measured at standard temperature and pressure.

The increase in viscosity can be any suitable increase in viscosity. In some examples, the increase in viscosity is a thickening of the composition. In some examples, the increase in viscosity can be so great that it can be characterized as a gelling of the composition. As used herein, "gel" refers to a solid, jelly-like material that can have properties ranging from soft and weak to hard and tough. Gels can be substantially dilute crosslinked systems, which can exhibit little or no flow. Gels can behave like solids or thick liquids but include predominantly liquid by weight. In some embodiments, the resulting viscosity after contacting with the subterranean material and after generation of a compound that modifies the viscosity of the composition can be an intermediate viscosity, wherein the viscosity of the composition can be further increased at a later time. In some embodiments, the resulting viscosity after contacting with the subterranean material and after generation of a compound that modifies the viscosity of the composition before or after contacting with the subterranean material, can be a final viscosity, with little or no further viscosity increase occurring later in the composition. The resulting viscosity of the composition can be 0.01 cP to 1,000,000,000 cP or more (e.g., the composition can be a gel having essentially infinite viscosity), 1 cP to about 100,000,000, or about 10 cP to about 1,000,000, or about 0.01 cP or less, or about 0.1 cP, 1 cP, 5 cP, 10 cP, 15 cP, 20 cP, 50 cP, 100 cP, 200 cP, 500 cP, 1000 cP, 5000 cP, 10,000 cP, 50,000 cP, 100,000 cP, 500,000 cP, 1,000,000 cP, 10,000,000 cP, 100,000,000 cP, 500,000,000 cP, or about 1,000,000,000 cP or more.

In some embodiments, the increase in viscosity or gelation can be reversible. In other embodiments, the increase in viscosity or gelation can be irreversible. In some embodiments, the gel can be a thixotropic gel.

Microorganism

The microorganism in various embodiments of the present invention can be any suitable microorganism, such that the microorganism can generate a compound such as an exopolysaccharide, wherein the compound can changes the properties of a composition used downhole, such as viscosity. The microorganism can be any microorganism that generates an exopolysaccharide that can be used downhole to change the properties of the composition, such as the viscosity. In some embodiments, the microorganism can generate the exopolysaccharide above the surface, while in some embodiments, the microorganism can generate the exopolysaccharide downhole. In embodiments, the composition can include any suitable number of microorganisms, including any suitable number of different microorganisms, and any suitable concentration of each individual type of microorganism.

In some embodiments, the microorganism can be an extremophilic or extremotolerant microorganism, which at least one of thrives, tolerates, or survives in extreme conditions. In some examples, the microorganism can be at least one of acidophilic, acidotolerant, alkaliphilic, alkalitolerant, anaerobic, cryptoendolithic, halophilic, halotolerant, hyperthermophilic, hyperthermotolerant, hypolithoc, lithoautotrophic, metallophilic, metallotolerant, oligotrophic, osmophilic, osmotolerant, piezophilic, piezotolerant, polyextremophilic, polyextremotolerant, psychrophilic, psychrotolerant, cryophilic, cryotolerant, radioresistant, thermophilic, thermotolerant, thermoacidophilic, thermoacidotolerant, xerophilic, or xerotolerant.

In some embodiments, the microorganism can be a microorganism that has been genetically modified using genetic material from an extremophilic or extremotolerant organism, such that the modified microorganism can generate an exopolysaccharide that can be generated by the extremophilic or extremotolerant organism. In some embodiments, the genetically modified organism can synthesize an exopolysaccharide under non-extreme conditions; in other embodiments, the genetically modified organism can synthesis the exopolysaccharide under extreme conditions. The genetic modification can occur in any suitable manner. For example, the genetic modification can include insertion of genes from an extremophilic or extremotolerant microorganism into the microorganism to be modified, wherein the genes inserted allow the modified microorganism to produce an exopolysaccharide that is produced by the extremophilic or extremotolerant microorganism.

The microorganism can be at least one of archaea, bacteria, fungi, and algea. The microorganism is not limited to the microorganisms listed herein, and can be any suitable microorganism that is extremophilic, extremotolerant, that can generate an exopolysaccharide, or that can be genetically modified to produce an exopolysaccharide. In some examples, the microorganism can be at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas*, and *Zymomonas*. In some embodiments, the microorganism can be at least one of *Acetobacter xylinum, Acinetobacter calcoaceticus, Aeropyrum pernix, Agrobacterium radiobacter, Alcaligenes faecalis* var. *myxogenes, Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Palleronia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris,* and *Zymomonas mobilis*. Any one of the microorganisms listed in this paragraph can be an example of an extremophilic or extremotolerant microorganism, or of a microorganism that can generate an exopolysaccharide.

Exopolysaccharide

Various embodiments of the present invention provide methods of using compositions that include exopolysaccharides and methods of using compositions that include microorganisms that generate exopolysaccharides. Some embodiments provide compositions that include exopolysaccharides or compositions that include microorganisms that can make exopolysaccharides. The exopolysaccharide can be any suitable exopolysaccharide.

Exopolysaccharides are high-molecular-weight polymers that are composed of sugar residues and are secreted by microorganisms into the surrounding environment. They can make up a substantial component of the extracellular polymers surrounding most microbial cells in extreme environments like Antarctic ecosystems, saline lakes, geothermal springs, or deep sea hydrothermal vents. Extremophile microorganisms have developed various adaptation strategies, enabling them to compensate for the deleterious effects of extreme conditions, high temperatures and salt concentrations, low pH or temperature, and high radiation. Among these strategies, the exopolysaccharide biosynthesis is one of the most common protective mechanisms. Many microorganisms (many species of Gram-positive and Gram-negative bacteria, archaea, fungi and some alga) can produce extracellular polysaccharides. Exopolysaccharides can be found as in capsular material or as dispersed slime in the surrounding environment with no obvious association to any one particular cell.

In some examples, exopolysaccharides can be heteropolysaccharides containing three or four different monosaccharides arranged in groups of 10 or less to form the repeating units. Exopolysaccharides can be linear and can have any suitable average molecular weight, such as an average molecular weight ranging from about $1 \times 10^3$ Da to about $1 \times 10^8$ Da, or about $3 \times 10^5$ Da to about $10 \times 10^5$ Da. They can include monosaccharide and noncarbohydrate substituents (such as acetate, pyruvate, succinate, and phosphate). Some EPSs are neutral macromolecules, and some are polyanionic due to, for example, the presence of uronic acids or ketal-linked pyruvate or inorganic residues. The exopolysaccharides synthesized by microorganisms can vary greatly in their composition and hence in their chemical and physical properties. Components of exopolysaccharides can include, for example, monosaccharides such as pentoses (e.g., D-arabinose, D-Ribose, and D-Xylose), hexoses (e.g., D-Glucose, D-Galactose, D-Mannose, D-Allose, L-Rhamnose, L-Fucose), amino sugars (e.g., D-Glucosamine and D-Galactosamine) or uronic acids (e.g., D-Glucuronic acids and D-Galacturonic acids). Organic or inorganic substituents such as sulphate, phosphate, acetic acid, succinic acid and pyruvic acid can be present. The linkages between monosaccharides can be any suitable linkage, such as 1,4-β- or 1,3-β-linkages in the backbones of some exopolysaccharides having stronger rigidity, or such as 1,2-α- or 1,6-α-linkages in some exopolysaccharides having greater flexibility.

In some embodiments of the present invention, the exopolysaccharide can be at least one of acetan, alginate, cellulose, chitosan, curdlan, a cyclosophoran, dextran, emulsan, a galactoglucopolysaccharide, gellan, glucuronan, N-acetylglucosamine, N-acetyl-heparosan, hyaluronic acid, indicant, kefiran, lentinan, levan, mauran, pullulan, scleroglucan, schizophyllan, stewartan, succinoglycan, xanthan, and welan. In some embodiments, the exopolysaccharide can be the same as a polysaccharide made by at least one microorganism chosen from (e.g. can be made by the microorganism or by a different microorganism) *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas*, and *Zymomonas*. In some embodiments, the exopolysaccharide can be the same as a polysaccharide made by at least one microorganism chosen from (e.g. can be made by the microorganism or by a different microorganism) *Acetobacter xylinum, Acinetobacter calcoaceticus, Aeropyrum pernix, Agrobacterium radiobacter, Alcaligenes faecalis* var. *myxogenes, Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Palleronia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris*, and *Zymomonas mobilis*.

The exopolysaccharide can be any suitable exopolysaccharide made by any suitable microorganism, so long as the exopolysaccharide or microorganism can be used in an embodiment of the method described herein. For example, acetan can be made by *Acetobacter* species, such as *Acetobacter xylinum*. Alginate can be made by *Azotobacter* species, such as *Azotobacter vinelandii*. Cellulose can be made by *Acetobacter* species, such as *Acetobacter xylinum*. Chitosan can be made by *Mucorales* species. Curdlan can be made by *Alcaligenes* species, such as *Alcaligenes faecalis* var. myxogenes, such as *Alcaligenes faecalis* var. myxogenes. Cyclosophorans can be made by *Agrobacterium* species, *Rhizobium* species, or *Xanthomonas*. Dextran can be made by *Leuconostoc* species or *lactobacillus* species, such as *Leuconostoc mesenteroides, Leuconostoc dextranicum* and *Lactobacillus hilgardii*. Emulsan can be made by *Acinetobacter* species, such as *Acinetobacter calcoaceticus*. Galactoglucopolysaccharides can be made by *Achromobacter* species, *Agrobacterium* species, *Agrobacterium* species, or *Rhizobium* species, such as *Agrobacterium radiobacter*, or *Pseudomonas marginalis*. Gellan can be made by *Aureomonas* species, or *Sphingomonas* species, such as *Aureomonas elodea* or *Sphingomonas paucimobilis*. Glucuronan can be made by *Sinorhizobium* species, such as *Sinorhizobium meliloti*. N-Acetyl-glucosamine can be made by *Staphylococcus* species, such as *Staphylococcus epidermidis*. N-Acetyl-heparosan can be made by *Escherichia* species, such as *Escherichia coli*. Hyaluronic acid can be made by *Streptococcus* species, such as *Streptococcus equi*. Indican can be made by *Beijerinckia* species, such as *Beijerinckia indica*. Kefiran can be made by *Lactobacillus* species, such as *Lactobacillus hilgardii*. Lentinan can be made by *Lentinus* species, such as *Lentinus elodes*. Levan can be made by *Alcaligenes* species, *Zymomonas* species, or *Bacillus* species, such as *Alcaligenes viscosus, Zymomonas mobilis*, or *Bacillus subtilis*. Pullulan can be made by *Aureobasidium* species, such as *Aureobasidium pullulans*. Scleroglucan can be made by *Sclerotium* species, such as *Sclerotium rolfsii, Sclerotium delfinii* and *Sclerotium glucanicum*. Schizophyllan can be made by *Schizophylum commune*. Stewartan can be made by *Pantoea* species, such as *Pantoea stewartii*, such as *Pantoea stewartii* subsp. *stewartii*. Succinoglycan can be made by *Alcaligenes* species, or *Sinorhizobium* species, such as *Alcaligenes faecalis, Alcaligenes faecalis* var. myxogenes, or *Sinorhizobium meliloti*. Xanthan can be made by *Xanthomonas* species, such as *Xanthomonas campestris*. Welan can be made by *Alcaligenes* species. Mauran can be made by *Halomonas* species, such as *Halomonas maura*.

Downhole Mixture or Composition.

In various embodiments, at least one of before, during, or after the contacting of the subterranean material and the composition including at least one of a microorganism and an exopolysaccharide, the composition including at least one of a microorganism and an exopolysaccharide that is contacted with a subterranean material can be any suitable downhole composition, such as any suitable composition used downhole for the drilling, completion, and production phases of a well. In various examples, the composition can be formed above the surface, in the borehole above a location wherein the properties of the composition are desired to be modified, or at or near the downhole location wherein the composition including at least one of a microorganism and an exopolysaccharide is contacted with the subterranean material. In some examples, at least one of a microorganism and an exopolysaccharide can include a suitable carrier material such as water or another solvent, and can be injected downhole to join a downhole fluid that is present downhole to form the composition that contacts the subterranean material and that experiences a change in properties, such as an increase in viscosity. In another embodiment, a downhole fluid can be combined with at least one of the microorganism or the exopolysaccharide above the surface to form the composition that can contact the subterranean material downhole and experience a change in properties, such as an increase in viscosity.

For example, in some examples, the microorganism or exopolysaccharide can be combined with any suitable downhole fluid, such as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form the composition for contacting with the subterranean material. A mixture that is contacted with the subterranean material can include any suitable weight percent of the microorganism, the exopolysaccharide, or the combination thereof, such as about 0.000,000,01 wt % to 99.999,99 wt %, 0.000,1-99.9 wt %, 0.1 wt % to 99.9 wt %, or about 20-90 wt %, or about 0.000,000,01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999,99 wt % or more of the composition.

In some examples, the composition including at least one of a microorganism and an exopolysaccharide can be used to modify the viscosity of the drilling fluid or other downhole fluid at a desired time or in a desired place, such as before or after placing the drilling fluid or other fluid downhole, or before, during, or after contacting a subterranean material with the drilling fluid or other fluid. In some embodiments, the composition advantageously allows adjustment of the viscosity or other properties of the drilling fluid or other fluid as needed while the drilling fluid or other fluid is being used. In some examples, the time or location of the microorganism's production or rate of production of a compound such as an exopolysaccharide allows the viscosity or other properties of the drilling fluid or other fluid to be adjusted such that in one or more locations of the borehole the drilling fluid or other fluid including at least one of a microorganism and an exopolysaccharide has a certain viscosity, while in one or more other locations of the borehole the drilling fluid or other fluid including at least one of a microorganism and an exopolysaccharide has a different viscosity. For example, during a drilling process, pressure can build up in the borehole due for example to penetration of the drill bit into a particular formation. The agitation or heating from drilling, or agitation or heating from increased flow of petroleum liquids or gases into the borehole, can cause an increase in the viscosity, thus timely preventing the increased pressure from causing a blowout or other undesirable consequences. In another example, during the drilling of porous material such as shale it can be desirable to prevent the influx of drilling fluid into the pores of the material to retain the stability of the material and thus of the stability of the borehole through the material. In some embodiments of the present invention, the viscosity of the drilling fluid proximate to the porous material can be increased to help prevent the influx of drilling fluid into the porous material, and thus preserve the integrity of the borehole A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reducing friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g. xanthan gum). Any ingredient listed in this paragraph can be either present or not present in the mixture. The drilling fluid can be present in the mixture with the composition including at least one of a microorganism and an exopolysaccharide in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of a oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 ($5^{th}$ ed. 1988). An oil-based or invert emulsion-based drilling fluid can include between about 50:50 to about 95:5 by volume of oil phase to water phase. A substantially all oil mud can includes A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including at least one of a microorganism and an exopolysaccharide can form a useful combination with cement or cement kiln dust, for example by modifying the viscosity or other properties of the cement at a desired time or in a desired place. For example, during the cementing phase of forming a well for petroleum extraction, some or parts of a particular borehole may require a thicker cement to allow the cement to properly set or to behave in another desired manner, while other parts of the borehole may not require as thick of a cement. A thicker cement can be more difficult to pump downhole. Various embodiments of the present invention allow for thickening or gelling of the cement or variation of other properties of the cement near or at the location where the thickened or otherwise modified material is desired. In another example, embodiments allow variation of the viscosity or other properties of the cement pumped downhole, such that a thicker or otherwise modified portion of cement can be placed downhole before, after, or between segments of cements having lower viscosity or other different properties.

The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50–90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

Composition for Treatment of a Subterranean Formation.

Various embodiments provide a composition for treatment of a subterranean formation. The composition can be any suitable composition that can be used to perform an embodiment of the method for treatment of a subterranean formation described herein.

In some embodiments, the present invention provides a composition for treatment of a subterranean formation, wherein the composition includes at least one exopolysaccharide. The composition can also include a downhole fluid. In some examples, the exopolysaccharide can be generated above the surface by subjecting an extremophilic or extremotolerant microorganism to conditions such that the microorganism forms the at least one exopolysaccharide, or by subjecting a microorganism genetically modified using an extremophilic or extremotolerant microorganism to conditions such that the microorganism forms the at least one exopolysaccharide. The exopolysaccharide can include any suitable exopolysaccharide, such as at least one of acetan, alginate, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan. The exopolysaccharide can be the same as a polysaccharide made by any of the microorganisms described herein, such as the same as a polysaccharide made by at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas.*

In various examples, the composition for treatment of a subterranean formation can include a microorganism that generates an exopolysaccharide under downhole conditions. The downhole conditions can be any suitable downhole conditions, such as extreme downhole conditions including at least one of high temperature, high pressure, or high salinity, or non-extreme downhole conditions. The composition can also include a downhole fluid, such as a drilling fluid, stimulation fluid, fracturing fluid, spotting fluid, clean-up fluid, production fluid, completion fluid, remedial treatment fluid, abandonment fluid, pill, acidizing fluid, cementing fluid, and a packer fluid.

In various embodiments, the microorganism in the composition can be any microorganism described herein, such as at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas*, and *Zymomonas*.

The exopolysaccharide can be any suitable exopolysaccharide described herein, such as at least one of acetan, alginate, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan. The exopolysaccharide in the composition can be any suitable exopolysaccharide made by any suitable microorganism, e.g. the exopolysaccharide can be the same as the exopolysaccharide made by at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas*, and *Zymomonas*.

In various embodiments, the present invention provides a composition for treatment of a subterranean formation, the composition including a microorganism including at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas*, and *Zymomonas*. In some examples, the microorganism can be at least one of *Acetobacter xylinum, Acinetobacter calcoaceticus, Aeropyrum pernix, Agrobacterium radiobacter, Alcaligenes faecalis* var. *myxogenes, Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Palleronia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris*, and *Zymomonas mobilis*. The composition can further include a downhole fluid.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include obtaining or providing a composition including an exopolysaccharide. The exopolysaccharide can be provided by at least one of subjecting an extremophilic or extremotolerant microorganism to conditions such that the microorganism forms the at least one exopolysaccharide, and subjecting a microorganism genetically modified using an extremophilic or extremotolerant microorganism to conditions such that the microorganism forms the at least one exopolysaccharide. The method can also include combining the composition with a downhole fluid.

In various embodiments, the present invention provides a method for preparing a composition for treatment of a subterranean formation. The method can be any suitable method that produces a composition described herein. For example, the method can include obtaining or providing a composition including a microorganism that generates an exopolysaccharide under downhole conditions, such as any suitable microorganism described herein, and such as any suitable exopolysaccharide described herein. The method can include combining the composition with a downhole fluid, such as a drilling fluid, stimulation fluid, fracturing fluid, spotting fluid, clean-up fluid, production fluid, completion fluid, remedial treatment fluid, abandonment fluid, pill, acidizing fluid, cementing fluid, and a packer fluid.

In various embodiments, the method for preparing a composition for treatment of a subterranean formation can include obtaining or providing a composition including an exopolysaccharide, such as any suitable exopolysaccharide described herein. The method can also include combining the composition with a downhole fluid, such as a drilling fluid, stimulation fluid, fracturing fluid, spotting fluid, clean-up fluid, production fluid, completion fluid, remedial treatment fluid, abandonment fluid, pill, acidizing fluid, cementing fluid, and a packer fluid.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising: obtaining or providing a composition comprising an exopolysaccharide provided by at least one of subjecting an extremophilic or extremotolerant microorganism to conditions such that the microorganism forms the at least one exopolysaccharide, and subjecting a microorganism genetically modified using an extremophilic or extremotolerant microorganism to conditions such that the microorganism forms the at least one exopolysaccharide; and contacting the composition with a subterranean material downhole.

Embodiment 2 provides the method of Embodiment 1, wherein the conditions the microorganism is subjected to comprise extreme conditions comprising at least one of high temperature conditions, high salinity conditions, high pressure conditions, and high pH conditions, and low pH conditions.

Embodiment 3 provides the method of any one of Embodiments 1-2, wherein the providing of the exopolysaccharide is performed above the surface.

Embodiment 4 provides the method of any one of Embodiments 1-3, wherein the providing of the exopolysaccharide is performed downhole.

Embodiment 5 provides the method of any one of Embodiments 1-4, wherein contacting the composition with a subterranean material downhole comprises adding the microorganism to a mixture downhole.

Embodiment 6 provides the method of any one of Embodiments 1-5, wherein the conditions the microorganism is subjected to comprise a temperature of about 50 to about 600° C.

Embodiment 7 provides the method of any one of Embodiments 1-6, wherein the conditions the microorganism is subjected to comprise a temperature of about 150 to about 500° C.

Embodiment 8 provides the method of any one of Embodiments 1-7, wherein the conditions the microorganism is subjected to comprise a salt concentration of about 0.000,000,1 g/L to about 250 g/L.

Embodiment 9 provides the method of any one of Embodiments 1-8, wherein the conditions the microorganism is subjected to comprise a salinity of about 10 g/L to about 250 g/L.

Embodiment 10 provides the method of any one of Embodiments 8-9, wherein the salt comprises at least one of NaCl, NaBr, $CaCl_2$, $CaBr_2$, or $ZnBr_2$.

Embodiment 11 provides the method of any one of Embodiments 1-10, wherein the conditions the microorganism is subjected to comprise a concentration of Na+ ions of about 5 ppmw to about 200,000 ppmw.

Embodiment 12 provides the method of any one of Embodiments 1-11, wherein the conditions the microorganism is subjected to comprise a concentration of Na+ ions of about 100 ppmw to about 7,000 ppmw.

Embodiment 13 provides the method of any one of Embodiments 1-12, wherein the conditions the microorganism is subjected to comprise a concentration of Cl— ions of about 10 ppmw to about 400,000 ppmw.

Embodiment 14 provides the method of any one of Embodiments 1-13, wherein the conditions the microorganism is subjected to comprise a concentration of Cl— ions of about 200 ppmw to about 14,000 ppmw.

Embodiment 15 provides the method of any one of Embodiments 1-14, wherein the conditions the microorganism is subjected to comprise a concentration of K+ ions of about 1 ppmw to about 70,000 ppmw.

Embodiment 16 provides the method of any one of Embodiments 1-15, wherein the conditions the microorganism is subjected to comprise a concentration of K+ ions of about 40 ppmw to about 2,500 ppmw.

Embodiment 17 provides the method of any one of Embodiments 1-16, wherein the conditions the microorganism is subjected to comprise a concentration of $Ca^{2+}$ ions of about 1 ppmw to about 70,000 ppmw.

Embodiment 18 provides the method of any one of Embodiments 1-17, wherein the conditions the microorganism is subjected to comprise a concentration of $Ca^{2+}$ ions of about 40 ppmw to about 2,500 ppmw.

Embodiment 19 provides the method of any one of Embodiments 1-18, wherein the conditions the microorganism is subjected to comprise a concentration of $Br^-$ ions of about 0.1 ppmw to about 12,000 ppmw.

Embodiment 20 provides the method of any one of Embodiments 1-19, wherein the conditions the microorganism is subjected to comprise a concentration of $Br^-$ ions of about 5 ppmw to about 450 ppmw.

Embodiment 21 provides the method of any one of Embodiments 1-20, wherein the conditions the microorganism is subjected to comprise a pressure of about 5,000 psi to about 200,000 psi.

Embodiment 22 provides the method of any one of Embodiments 1-21, wherein the conditions the microorganism is subjected to comprise a pressure of about 10,000 psi to about 100,000 psi.

Embodiment 23 provides the method of any one of Embodiments 1-22, wherein the conditions the microorganism is subjected to comprise a pH of about −20 to about 20.

Embodiment 24 provides the method of any one of Embodiments 1-23, wherein the conditions the microorganism is subjected to comprise a pH of about −1 to about 14.

Embodiment 25 provides the method of any one of Embodiments 1-24, wherein the microorganism is at least one of an acidophile, an alkaliphile, an anaerobe, a cryptoendolith, a halophile, a hyperthermophile, a hypolith, a lithoautotroph, metallotolerant, an oligotroph, an osmophile, a piezophile, a polyextremophile, a psychrophile, a cryophile, radioresistant, a thermophile, a thermoacidophile, and a xerophile.

Embodiment 26 provides the method of any one of Embodiments 1-25, wherein the microorganism is at least one of acidotolerant, alkalitolerant, anaerobe, a cryptoendolith, halotolerant, a hyperthermophile, a hypolith, a lithoautotroph, metallotolerant, an oligotroph, osmotolerant, piezotolerant, polyextremotolerant, psychrotolerant, cryotolerant, radioresistant, thermotolerant, thermoacidotolerant, and xerotolerant.

Embodiment 27 provides the method of any one of Embodiments 1-26, comprising subjecting a plurality of microorganisms to the conditions.

Embodiment 28 provides the method of any one of Embodiments 1-27, wherein the microorganism is at least one of archaea, bacteria, fungi, and algea.

Embodiment 29 provides the method of any one of Embodiments 1-28, wherein the microorganism is at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas*, and *Zymomonas*.

Embodiment 30 provides the method of any one of Embodiments 1-29, wherein the microorganism is at least one of *Acetobacter xylinum, Acinetobacter calcoaceticus, Aeropyrum pernix, Agrobacterium radiobacter, Alcaligenes faecalis* var. myxogenes, *Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Palleronia marisminoris, Pantoea stewartii* subsp. *Stewartii,* *Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris,* and *Zymomonas mobilis*.

Embodiment 31 provides the method of any one of Embodiments 1-30, wherein the exopolysaccharide is at least one of acetan, alginate, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan.

Embodiment 32 provides the method of any one of Embodiments 1-31, wherein the exopolysaccharide is the same as an exopolysaccharide made by a microorganism comprising at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas*.

Embodiment 33 provides the method of any one of Embodiments 1-32, wherein the exopolysaccharide is the same as an exopolysaccharide made by a microorganism comprising at least one of *Acetobacter xylinum, Acinetobacter calcoaceticus, Aeropyrum pernix, Agrobacterium radiobacter, Alcaligenes faecalis* var. myxogenes, *Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii,*

*Natronobacterium gregoryi, Palleronia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris*, and *Zymomonas mobilis*.

Embodiment 34 provides the method of any one of Embodiments 1-33, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the contacting of the subterranean material and the composition comprises contacting the subterranean material and the mixture.

Embodiment 35 provides the method of any one of Embodiments 34, wherein the cementing fluid comprises Portland cement, pozzolana cement, gypsum cement, high alumina content cement, slag cement, silica cement, or a combination thereof.

Embodiment 36 provides the method of any one of Embodiments 1-35, wherein at least one of prior to, during, and after the contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 37 provides the method of any one of Embodiments 1-36, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, density control agent, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 38 provides a method of treating a subterranean formation, the method comprising: providing at least one exopolysaccharide by at least one of subjecting an extremophilic or extremotolerant microorganism to conditions such that the microorganism forms the exopolysaccharide, and subjecting a microorganism genetically modified using an extremophilic or extremotolerant microorganism to conditions such that the microorganism forms the exopolysaccharide, the extremophilic or extremotolerant microorganism comprising at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas*; and contacting a composition comprising the exopolysaccharide with a subterranean material downhole.

Embodiment 39 provides a method of treating a subterranean formation, the method comprising: providing at least one exopolysaccharide by at least one of subjecting an extremophilic or extremotolerant microorganism to conditions such that the microorganism forms the exopolysaccharide, and subjecting a microorganism genetically modified using an extremophilic or extremotolerant microorganism to conditions such that the microorganism forms the exopolysaccharide, the exopolysaccharide comprising at least one of acetan, alginate, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan; and contacting a composition comprising the exopolysaccharide with a subterranean material downhole.

Embodiment 40 provides a method of treating a subterranean formation, the method comprising: obtaining or providing a composition comprising a microorganism, the composition having a viscosity; and contacting the composition with a subterranean material downhole under conditions such that the microorganism produces at least one compound that increases the viscosity of the composition.

Embodiment 41 provides the method of Embodiment 40, wherein during the contacting of the composition with the subterranean material downhole, the conditions comprise at least one of high temperature conditions, high salinity conditions, high pressure conditions, and high pH conditions, and lower pH conditions.

Embodiment 42 provides the method of any one of Embodiments 40-41, wherein the obtaining or providing of the composition is performed downhole.

Embodiment 43 provides the method of Embodiment 42, wherein obtaining or providing the composition comprises adding the microorganism to a mixture downhole.

Embodiment 44 provides the method of any one of Embodiments 40-43, wherein the obtaining or providing of the composition is performed above the surface.

Embodiment 45 provides the method of any one of Embodiments 40-44, wherein during the contacting of the composition with the subterranean material downhole, the conditions comprise a temperature of about 50 to about 600° C.

Embodiment 46 provides the method of any one of Embodiments 40-45, wherein during the contacting of the composition with the subterranean material downhole, the conditions comprise a temperature of about 150 to about 500° C.

Embodiment 47 provides the method of any one of Embodiments 40-46, wherein during the contacting of the composition with the subterranean material downhole, the conditions comprise a salt concentration of about 0.000,000,1 g/L to about 250 g/L.

Embodiment 48 provides the method of any one of Embodiments 40-47, wherein during the contacting of the composition with the subterranean material downhole, the conditions comprise a salinity of about 10 g/L to about 250 g/L.

Embodiment 49 provides the method of any one of Embodiments 47-48, wherein the salt comprises at least one of NaCl, NaBr, $CaCl_2$, $CaBr_2$, or $ZnBr_2$.

Embodiment 50 provides the method of any one of Embodiments 40-49, wherein during the contacting of the composition with the subterranean material downhole, the conditions comprise a concentration of $Na^+$ ions of about 5 ppmw to about 200,000 ppmw.

Embodiment 51 provides the method of any one of Embodiments 40-50, wherein during the contacting of the composition with the subterranean material downhole, the conditions comprise a concentration of $Na^+$ ions of about 100 ppmw to about 7,000 ppmw.

Embodiment 52 provides the method of any one of Embodiments 40-51, wherein during the contacting of the composition with the subterranean material downhole, the conditions comprise a concentration of $Cl^-$ ions of about 10 ppmw to about 400,000 ppmw.

Embodiment 53 provides the method of any one of Embodiments 40-52, wherein during the contacting of the composition with the subterranean material downhole, the conditions comprise a concentration of $Cl^-$ ions of about 200 ppmw to about 14,000 ppmw.

Embodiment 54 provides the method of any one of Embodiments 40-53, wherein during the contacting of the composition with the subterranean material downhole, the conditions comprise a concentration of $K^+$ ions of about 1 ppmw to about 70,000 ppmw.

Embodiment 55 provides the method of any one of Embodiments 40-54, wherein during the contacting of the composition with the subterranean material downhole, the conditions comprise a concentration of $K^+$ ions of about 40 ppmw to about 2,500 ppmw.

Embodiment 56 provides the method of any one of Embodiments 40-55, wherein during the contacting of the composition with the subterranean material downhole, the conditions comprise a concentration of $Ca^{2+}$ ions of about 1 ppmw to about 70,000 ppmw.

Embodiment 57 provides the method of any one of Embodiments 40-56, wherein during the contacting of the composition with the subterranean material downhole, the conditions comprise a concentration of $Ca^{2+}$ ions of about 40 ppmw to about 2,500 ppmw.

Embodiment 58 provides the method of any one of Embodiments 40-57, wherein during the contacting of the composition with the subterranean material downhole, the conditions comprise a concentration of $Br^-$ ions of about 0.1 ppmw to about 12,000 ppmw.

Embodiment 59 provides the method of any one of Embodiments 40-58, wherein during the contacting of the composition with the subterranean material downhole, the conditions comprise a concentration of $Br^-$ ions of about 5 ppmw to about 450 ppmw.

Embodiment 60 provides the method of any one of Embodiments 40-59, wherein during the contacting of the composition with the subterranean material downhole, the conditions comprise a pressure of about 5,000 psi to about 200,000 psi.

Embodiment 61 provides the method of any one of Embodiments 40-60, wherein during the contacting of the composition with the subterranean material downhole, the conditions comprise a pressure of about 10,000 psi to about 100,000 psi.

Embodiment 62 provides the method of any one of Embodiments 40-61, wherein during the contacting of the composition with the subterranean material downhole, the conditions comprise a pH of about −20 to about 20.

Embodiment 63 provides the method of any one of Embodiments 40-62, wherein during the contacting of the composition with the subterranean material downhole, the conditions comprise a pH of about −1 to about 14.

Embodiment 64 provides the method of any one of Embodiments 40-63, wherein the microorganism is at least one of an acidophile, an alkaliphile, an anaerobe, a cryptoendolith, a halophile, a hyperthermophile, a hypolith, a lithoautotroph, metallotolerant, an oligotroph, an osmophile, a piezophile, a polyextremophile, a psychrophile, a cryophile, radioresistant, a thermophile, a thermoacidophile, and a xerophile.

Embodiment 65 provides the method of any one of Embodiments 40-64, wherein the composition comprises a plurality of microorganisms.

Embodiment 66 provides the method of any one of Embodiments 40-65, wherein the microorganism is at least one of archaea, bacteria, fungi, and algea.

Embodiment 67 provides the method of any one of Embodiments 40-66, wherein the microorganism is at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas*, and *Zymomonas*.

Embodiment 68 provides the method of any one of Embodiments 40-67, wherein the microorganism is at least one of *Acetobacter xylinum, Acinetobacter calcoaceticus, Aeropyrum pernix, Agrobacterium radiobacter, Alcaligenes faecalis* var. myxogenes, *Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium auruntiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepi-* damans, *Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Palleronia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris,* and *Zymomonas mobilis.*

Embodiment 69 provides the method of any one of Embodiments 40-68, wherein the compound is at least one of acetan, alginate, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan.

Embodiment 70 provides the method of any one of Embodiments 40-69, wherein the compound is the same as a compound made by a microorganism comprising at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas.*

Embodiment 71 provides the method of any one of Embodiments 40-70, wherein the compound is the same as a compound made by a microorganism comprising at least one of *Acetobacter xylinum, Acinetobacter calcoaceticus, Aeropyrum pernix, Agrobacterium radiobacter, Alcaligenes faecalis* var. *myxogenes, Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Palleronia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris,* and *Zymomonas mobilis.*

Embodiment 72 provides the method of any one of Embodiments 40-71, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the contacting of the subterranean material and the composition comprises contacting the subterranean material and the mixture.

Embodiment 73 provides the method of Embodiment 72, wherein the cementing fluid comprises Portland cement, pozzolana cement, gypsum cement, high alumina content cement, slag cement, silica cement, or a combination thereof.

Embodiment 74 provides the method of any one of Embodiments 40-73, wherein at least one of prior to, during, and after the contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 75 provides the method of any one of Embodiments 40-74, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, density control agent, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 76 provides a method of treating a subterranean formation, the method comprising: obtaining or providing a composition comprising an exopolysaccharide; contacting the composition with a subterranean material downhole.

Embodiment 77 provides the method of Embodiment 76, wherein the exopolysaccharide is generated above the surface by at least one of subjecting an extremophilic or extremotolerant microorganism to conditions such that the microorganism forms the at least one exopolysaccharide, and subjecting a microorganism genetically modified using an extremophilic or extremotolerant microorganism to conditions such that the microorganism forms the at least one exopolysaccharide.

Embodiment 78 provides the method of any one of Embodiments 76-77, wherein the exopolysaccharide comprises at least one of acetan, alginate, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan.

Embodiment 79 provides the method of any one of Embodiments 76-78, wherein the exopolysaccharide comprises an exopolysaccharide made by a microorganism comprising at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas.*

Embodiment 80 provides the method of any one of Embodiments 76-79, wherein the exopolysaccharide comprises an exopolysaccharide made by a microorganism comprising at least one of *Acetobacter xylinum, Acinetobacter calcoaceticus, Aeropyrum pernix, Agrobacterium radiobacter, Alcaligenes faecalis* var. myxogenes, *Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Palleronia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris,* and *Zymomonas mobilis.*

Embodiment 81 provides a method of treating a subterranean formation, the method comprising: obtaining or providing a composition comprising a microorganism, the microorganism comprising at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas;* contacting the composition with a subterranean material downhole.

Embodiment 82 provides the method of Embodiment 81, wherein the microorganism comprises at least one of *Acetobacter xylinum, Acinetobacter calcoaceticus, Aeropyrum pernix, Agrobacterium radiobacter, Alcaligenes faecalis* var. myxogenes, *Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Pallero-*

*nia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris,* and *Zymomonas mobilis*.

Embodiment 83 provides a method of treating a subterranean formation, the method comprising: obtaining or providing a composition comprising a microorganism; and contacting the composition with a subterranean material downhole, such that the microorganism produces an exopolysaccharide.

Embodiment 84 provides the method of Embodiment 83, wherein the microorganism comprises at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas*.

Embodiment 85 provides the method of any one of Embodiments 83-84, wherein the exopolysaccharide is an exopolysaccharide made by a microorganism comprising at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas*.

Embodiment 86 provides a composition for treatment of a subterranean formation, the composition comprising: an exopolysaccharide.

Embodiment 87 provides the composition of Embodiment 86, wherein the exopolysaccharide is generated above the surface by at least one of subjecting an extremophilic or extremotolerant microorganism to conditions such that the microorganism forms the at least one exopolysaccharide, and subjecting a microorganism genetically modified using an extremophilic or extremotolerant microorganism to conditions such that the microorganism forms the at least one exopolysaccharide.

Embodiment 88 provides the composition of any one of Embodiments 86-87, further comprising a downhole fluid.

Embodiment 89 provides the composition of any one of Embodiments 86-88, wherein the exopolysaccharide comprises acetan, alginate, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan.

Embodiment 90 provides the composition of any one of Embodiments 86-89, wherein the exopolysaccharide comprises an exopolysaccharide made by at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas*.

Embodiment 91 provides a composition for treatment of a subterranean formation, the composition comprising: a microorganism that generates an exopolysaccharide under downhole conditions; and a downhole fluid.

Embodiment 92 provides the method of Embodiment 91, wherein the downhole conditions comprise a temperature of about 50 to about 600° C.

Embodiment 93 provides the method of any one of Embodiments 91-92, wherein the downhole conditions comprise a salt concentration of about 0.000,000,1 g/L to about 250 g/L.

Embodiment 94 provides the method of Embodiment 93, wherein the salt comprises at least one of NaCl, NaBr, $CaCl_2$, $CaBr_2$, or $ZnBr_2$.

Embodiment 95 provides the method of any one of Embodiments 91-94, wherein the downhole conditions comprise a pressure of about 5,000 psi to about 200,000 psi.

Embodiment 96 provides the method of any one of Embodiments 91-95, wherein during the downhole conditions comprise a pH of about −20 to about 20.

Embodiment 97 provides the composition of any one of Embodiments 91-96, wherein the downhole fluid comprises at least one of a drilling fluid, stimulation fluid, fracturing fluid, spotting fluid, clean-up fluid, production fluid, completion fluid, remedial treatment fluid, abandonment fluid, pill, acidizing fluid, cementing fluid, and a packer fluid.

Embodiment 98 provides the composition of any one of Embodiments 91-97, wherein the microorganism comprises at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina,*

*Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas.*

Embodiment 99 provides the composition of any one of Embodiments 91-98, wherein the exopolysaccharide comprises at least one of at least one of acetan, alginate, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan.

Embodiment 100 provides the composition of any one of Embodiments 91-99, wherein the exopolysaccharide comprises an exopolysaccharide made by at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas.*

Embodiment 101 provides a composition for treatment of a subterranean formation, the composition comprising a microorganism comprising at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas.*

Embodiment 102 provides the composition of Embodiment 101, wherein the microorganism comprises at least one of *Acetobacter xylinum, Acinetobacter calcoaceticus, Aeropyrum pernix, Agrobacterium radiobacter, Alcaligenes faecalis* var. *myxogenes, Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Palleronia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris,* and *Zymomonas mobilis.*

Embodiment 103 provides the composition of any one of Embodiments 101-102, further comprising a downhole fluid.

Embodiment 104 provides a method for preparing a composition for treatment of a subterranean formation, the method comprising: obtaining or providing a composition comprising an exopolysaccharide provided by at least one of subjecting an extremophilic or extremotolerant microorganism to conditions such that the microorganism forms the at least one exopolysaccharide, and subjecting a microorganism genetically modified using an extremophilic or extremotolerant microorganism to conditions such that the microorganism forms the at least one exopolysaccharide; and combining the composition with a downhole fluid.

Embodiment 105 provides a method for preparing a composition for treatment of a subterranean formation, the method comprising: obtaining or providing a composition comprising a microorganism that generates an exopolysaccharide under downhole conditions; combining the composition with a downhole fluid.

Embodiment 106 provides a method for preparing a composition for treatment of a subterranean formation, the method comprising: obtaining or providing a composition comprising an exopolysaccharide; combining the composition with a downhole fluid.

Embodiment 107 provides the apparatus or method of any one or any combination of Embodiments 1-106 optionally configured such that all elements or options recited are available to use or select from.

What is claimed is:

1. A method of treating a subterranean formation, the method comprising:
providing at least one exopolysaccharide by at least one of
subjecting an extremophilic or extremotolerant microorganism to conditions comprising a temperature of about 150° C. to about 500° C. such that the microorganism forms the exopolysaccharide, or
subjecting a microorganism genetically modified using an extremophilic or extremotolerant microorganism to conditions comprising a temperature of about 150° C. to about 500° C. such that the microorganism forms the exopolysaccharide; and contacting the subterranean formation with a composition comprising the exopolysaccharide, the exopolysaccharide being a viscosity modifying compound that increases viscosity of the composition, wherein the extremophilic or extremotolerant microorganism is at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas, Zymomonas, Acetobacter xylinum, Acinetobacter calcoaceticus, Aeropyrum pernix, Agrobacterium radiobacter, Alcaligenes faecalis* var. *myxogenes, Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Palleronia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris,* or *Zymomonas mobilis.*

2. The method of claim 1, wherein the providing of the exopolysaccharide is performed above the surface.

3. The method of claim 1, wherein the providing of the exopolysaccharide is performed downhole.

4. The method of claim 1, wherein placing the composition in the subterranean formation comprises placing the microorganism in the subterranean formation.

5. The method of claim 1, wherein the temperature is about 200° C. to about 500° C.

6. The method of claim 1, wherein the microorganism is at least one of an acidophile, an alkaliphile, an anaerobe, a cryptoendolith, a halophile, a hyperthermophile, a hypolith, a lithoautotroph, metallotolerant, an oligotroph, an osmophile, a piezophile, a polyextremophile, a psychrophile, a cryophile, radioresistant, a thermophile, a thermoacidophile, or a xerophile.

7. The method of claim 1, wherein the microorganism is at least one of acidotolerant, alkalitolerant, anaerobe, a cryptoendolith, halotolerant, a hyperthermophile, a hypolith, a lithoautotroph, metallotolerant, an oligotroph, osmotolerant, piezotolerant, polyextremotolerant, psychrotolerant, cryotolerant, radioresistant, thermotolerant, thermoacidotolerant, or xerotolerant.

8. The method of claim 1, wherein the microorganism is at least one of archaea, bacteria, fungi, or algea.

9. The method of claim 1, wherein the exopolysaccharide is at least one of acetan, alginate, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, or welan.

10. The method of claim 1, wherein the exopolysaccharide is the same as an exopolysaccharide made by a microorganism comprising at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* or *Zymomonas.*

11. The method of claim 1, wherein the exopolysaccharide is the same as an exopolysaccharide made by a microorganism comprising at least one of *Acetobacter xylinum, Acinetobacter calcoaceticus, Aeropyrum pernix, Agrobacterium radiobacter, Alcaligenes faecalis* var. *myxogenes, Alcaligenes viscosus, Alteromonas hispanica, Alteromonas infernus, Alteromonas macleodii* subsp. *Fijiensis, Aquifex aeolicus, Archaeoglobus fulgidus, Aureomonas elodea, Azotobacter vinelandii, Bacillus licheniformis, Bacillus megaterium, Bacillus subtilis, Bacillus thermodenitrificans, Beijerinckia indica, Chromohalobacter beijerinckii, Colwellia psychrerythraea, Escherichia coli, Exiguobacterium acetylicum, Exiguobacterium aestuarii, Exiguobacterium antarticum, Exiguobacterium artmeiae, Exiguobacterium aurantiacum, Exiguobacterium marinum, Exiguobacterium mexicanum, Exiguobacterium oxidotolerans, Exiguobacterium profumsum, Exiguobacterium sibiricum, Exiguobacterium undae, Geobacillus tepidamans, Geothermobacterium*

*ferrireducens, Hahella chejuensis, Haloarcula hispanica, Haloarcula japonica, Haloarcula marismortui, Halobacterium noricense, Halobiforma haloterrestris, Halococcus dombrowskii, Halococcus salifodinae, Haloferax denitrificans, Haloferax gibbonsii, Haloferax mediterranei, Haloferax volcanii, Halomonas alkaliantarctica, Halomonas eurihalina, Halomonas maura, Halomonas salaria, Halopiger aswanensis, Haloterrigena hispanica, Lactobacillus hilgardii, Lentinus elodes, Leuconostoc dextranicum, Leuconostoc mesenteroides, Methanococcus jannaschii, Natronobacterium gregoryi, Palleronia marisminoris, Pantoea stewartii* subsp. *Stewartii, Phoma herbarum, Pseudoalteromonas antarctica, Pseudomonas aeruginosa, Pseudomonas marginalis, Pyrococcus furiosus, Pyrolobus fumarii, Salipiger mucosus, Sclerotium delfinii, Sclerotium glucanicum, Sclerotium rolfsii, Sinorhizobium meliloti, Sphingomonas paucimobilis, Staphylococcus epidermidis, Streptococcus equi, Sulfolobus solfataricus, Tetragenococcus halophilus, Thermococcus litoralis, Thermotoga maritima, Thermus aquaticus, Vibrio Diabolicus, Xanthomonas campestris,* or *Zymomonas mobilis.*

12. The method of claim 1, wherein the composition comprises a mixture of the exopolysaccharide and an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

13. The method of claim 12, wherein the cementing fluid comprises Portland cement, pozzolana cement, gypsum cement, high alumina content cement, slag cement, silica cement, or a combination thereof.

14. The method of claim 1, wherein at least one of prior to, during, or contacting the subterranean formation with the composition, the composition is used downhole, at least one of alone or in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

15. A method of treating a subterranean formation, the method comprising:
providing at least one exopolysaccharide by at least one of
subjecting an extremophilic or extremotolerant microorganism to conditions comprising a temperature of about 150° C. to about 500° C. such that the microorganism forms the exopolysaccharide, or
subjecting a microorganism genetically modified using an extremophilic or extremotolerant microorganism to conditions comprising a temperature of about 150° C. to about 500° C. such that the microorganism forms the exopolysaccharide,
the extremophilic or extremotolerant microorganism comprising at least one of *Acetobacter, Achromobacter, Acinetobacter, Aeropyrum, Agrobacterium, Alcaligenes, Alteromonas, Aquifex, Archaeoglobus, Aureomonas, Azotobacter, Bacillus, Beijerinckia, Chromohalobacter, Colwellia, Escherichia, Exiguobacterium, Geobacillus, Geothermobacterium, Hahella, Haloarcula, Halobacterium, Halobiforma, Halococcus, Haloferax, Halomonas, Halopiger, Haloquadratum, Halorubrum, Haloterrigena, Idiomarina, Lactobacillus, Lentinus, Leuconostoc, Methanococcus, Methanosarcina, Methylobacterium, Micrococcus, Mucorales, Natrialba, Natronobacterium, Natronococcus, Palleronia, Pantoea, Paracoccus, Phoma, Pseudoalteromonas, Pseudomonas, Pyrococcus, Pyrolobus, Rhizobium, Rhodococcus, Salipiger, Sclerotium, Sinorhizobium, Sphingomonas, Staphylococcus, Sulfolobus, Tetragenococcus, Thermococcus, Thermotoga, Thermus, Vibrio, Xanthomonas,* and *Zymomonas*; and
contacting the subterranean formation with a composition comprising the exopolysaccharide, the exopolysaccharide being a viscosity modifying compound that increases viscosity of the composition.

16. A method of treating a subterranean formation, the method comprising:
providing at least one exopolysaccharide by at least one of
subjecting an extremophilic or extremotolerant microorganism to conditions comprising a temperature of about 150° C. to about 500° C. such that the microorganism forms the exopolysaccharide, or
subjecting a microorganism genetically modified using an extremophilic or extremotolerant microorganism to conditions comprising a temperature of about 150° C. to about 500° C. such that the microorganism forms the exopolysaccharide,
the exopolysaccharide comprising at least one of acetan, alginate, cellulose, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, and welan; and
contacting the subterranean formation with a composition comprising the exopolysaccharide, the exopolysaccharide being a viscosity modifying compound that increases viscosity of the composition.

17. A method of treating a subterranean formation, the method comprising:
providing at least one exopolysaccharide by at least one of
subjecting an extremophilic or extremotolerant microorganism to conditions comprising a temperature of about 150° C. to about 500° C. such that the microorganism forms the exopolysaccharide, or
subjecting a microorganism genetically modified using an extremophilic or extremotolerant microorganism to conditions comprising a temperature of about 150° C. to about 500° C. such that the microorganism forms the exopolysaccharide; and
contacting the subterranean formation with a composition comprising the exopolysaccharide, the exopolysaccharide being a viscosity modifying compound that increases viscosity of the composition,
wherein the providing of the exopolysaccharide is performed above the surface.

\* \* \* \* \*